United States Patent [19]

Yeakey et al.

[11] Patent Number: 4,468,483

[45] Date of Patent: Aug. 28, 1984

[54] AROMATIC POLYESTER POLYCARBONATES FROM POLYOLS DERIVED FROM RECYCLED POLYETHYLENE TEREPHTHALATE

[75] Inventors: Ernest L. Yeakey; Michael Cuscurida, both of Austin, Tex.

[73] Assignee: Texaco Inc., White Plains, N.Y.

[21] Appl. No.: 491,943

[22] Filed: May 5, 1983

[51] Int. Cl.$^3$ ............................................. C08G 18/14
[52] U.S. Cl. .................................... 521/172; 260/463; 521/173; 528/271; 528/272; 528/361; 528/370; 528/371; 528/405
[58] Field of Search ............... 528/271, 272, 361, 370, 528/371, 405; 260/463; 521/172, 173

[56] References Cited

U.S. PATENT DOCUMENTS

| | | | |
|---|---|---|---|
| 3,248,414 | 4/1966 | Stevens | 528/196 |
| 4,267,120 | 5/1981 | Cuscurida et al. | 521/174 |
| 4,374,961 | 2/1983 | Kudo et al. | 528/272 |

*Primary Examiner*—Maurice J. Welsh
*Attorney, Agent, or Firm*—Jack H. Park; Kenneth R. Priem; David L. Mossman

[57] ABSTRACT

A novel class of aromatic polyester polycarbonates is described. The polycarbonates are made by reacting an alkylene carbonate with an aromatic polyester polyol over a polycarbonate formation catalyst such as potassium stannate. In turn, the polyol is made by esterifying a dibasic acid waste stream with an alkylene glycol to produce a polyester polyol which is subsequently used to transesterify recycled polyethylene terephthalate.

8 Claims, No Drawings

AROMATIC POLYESTER POLYCARBONATES FROM POLYOLS DERIVED FROM RECYCLED POLYETHYLENE TEREPHTHALATE

BACKGROUND OF THE INVENTION

1. Field of the Invention

The invention relates to novel aromatic polyester polycarbonates made from reacting an alkylene carbonate with a polyol in the presence of a catalyst, and more particularly relates to novel aromatic polyester polycarbonates made from an alkylene carbonate and an aromatic polyester polyol where the polyol is derived from recycled polyethylene terephthalate.

2. Description of Other Relevant Compounds in the Field

Polyurethane polymers and polyisocyanurate polymers such as those in rigid and flexible foams are well known in the art. The latter type of polymers are made by utilizing a polyisocyanurate group formation catalyst to promote formation of both isocyanurate linkages and urethane linkages to produce urethane-modified polyisocyanurate polymers.

Both polyesters and polycarbonates have been used in the preparation of polyurethane polymers. Materials of this type are used to prepare both polyurethane and polyisocyanurate flexible and rigid foams as well as semi-flexible and semi-rigid foams. Polycarbonates may be made by reacting a glycol with a carbonate ester in the presence of a zinc borate-alkali earth metal oxide catalyst system as revealed in U.S. Pat. No. 3,133,113. Various techniques for preparing high molecular weight polycarbonates by reacting dihydric initiators with alkylene oxides and carbon dioxide are taught by U.S. Pat. Nos. 3,248,414; 3,248,415 and 3,248,416.

Polycarbonates have also found utility in coating and laminate form. U.S. Pat. No. 3,764,457 teaches laminates for use as automobile windshields comprising a polycarbonate urethane and one or more sheets of glass. The urethane is formed from an aliphatic polycarbonate, a cycloaliphatic diisocyanate and a monomeric aliphatic diol. Similar laminates employing hydroxyl-terminated polycarbonates are described in German Offenlegungschrifft No. 2,258,131 cited in Chemical Abstracts 82:58865v, 1975.

U.S. Pat. No. 3,758,443 describes the preparation of polyurethane elastomers by reacting polyester polyol polycarbonates, having a molecular weight of 800 to 2,500, with diisocyanates and low molecular weight polyhydric compounds having molecular weights lower than 400. Thermo-plastic carbonate-modified co-polyesters for the injection molding process were made by the reaction of aromatic dicarboxylic acids or other esters of dihydric alcohols which have carbonic and ester groupings and hydroxyalkyl end groups according to U.S. Pat. No. 4,041,018.

U.S. Pat. No. 4,072,704 reveals that multiblock coupled polyalkylene glycol co-polymer surfactants may be prepared from individual blocks of polymers and co-polymers by the reaction of these with bifunctional compounds to form polycarbonate esters and polyformates. Further, polyester polycarbonates may be prepared by the reaction of cyclic organic anhydrides, alkylene oxides, carbon dioxide and polyhydric compounds as discussed in U.S. Pat. No. 4,267,120. These latter polycarbonates are shown to be useful for the preparation of polyisocyanurate foams.

While many of the polycarbonates described work well, it is always an objective to make these polycarbonates as cheaply as possible.

SUMMARY OF THE INVENTION

The invention involves a novel aromatic polyester polycarbonate made by reacting an alkylene carbonate with an aromatic polyester polyol in the presence of a polycarbonate formation catalyst. The aromatic polyester polyol is made by esterifying a dibasic acid waste stream with an alkylene glycol to produce a polyester polyol and subsequently transesterifying recycled polyethylene terephthalate with the polyester polyol from the previous step.

DETAILED DESCRIPTION OF THE PREFERRED EMBODIMENTS

The novel polycarbonates of this invention are generally less expensive than many other polycarbonates because they are made from aromatic polyester polyols which in turn are made from recycled polyethylene terephthalate (PET), an inexpensive feedstock. Dibasic acid residues are also used in the manufacture of these polyols to help lower the price. Also, these polycarbonates have utility in a greater number of urethane applications than some other polycarbonates. These novel polycarbonates are useful in low density packaging foams, rigid urethane foams, isocyanurate foams and flexible urethane foams.

The aromatic polyester polyols made from recycled PET are described in detail in U.S. patent application Ser. No. 443,778 filed Nov. 22, 1982. Generally, these polyols are produced by esterifying, in the absence of a catalyst, a dibasic acid residue with an alkylene glycol to form a polyester polyol. Subsequently, transesterification of recycled polyethylene terephthalate with the polyester polyol reaction product, in the absence of a catalyst, produces the aromatic polyester polyol.

The recycled PET may be any scrap residue from old polyethylene terephthalate which contains compounds which have the moiety

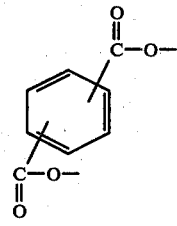

Generally, the scrap or recycled polyethylene terephthalate may be in any particulate form. A frequently seen form is fragmentized soft drink bottles which appear as clear or colored chips. Polyethylene film can also be recycled. Any chopping or pulverizing process which produces small bits of solid PET from the larger, waste recycled article would be appropriate to produce scrap PET useful herein. Sometimes the scrap PET is mixed with a solvent to make a kind of slurry. While scrap PET slurry could be used in the method of this invention, the recycled PET chips without the solvent are also useful.

The polyester polyol with which the polyethylene terephthalate scrap is reacted is produced by the esterification of a residue of dibasic acid manufacture, as noted before. Dibasic acids are those acids which have two displaceable hydrogen atoms. Examples of such acids are succinic, glutaric and adipic acid. Especially preferred are the residues from adipic acid which contain portions of each of the three acids listed above. It is necessary that the acids be dibasic so that polymer chains can be formed upon reaction with the glycol. These materials may also include waste dicarboxylic acids.

Preferably, the alkylene glycol has the formula

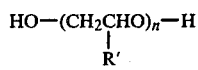

where R' is hydrogen or lower alkyl of one to four carbon atoms and n is from 1 to 3. Glycols which meet this definition are ethylene glycol, propylene glycol (1,2-propylene glycol), diethylene glycol (DEG), dipropylene glycol, and triethylene glycol (TEG), among others. The glycol may be a residue or flash-separated glycol.

The polyester polyol which results from the reaction of the dibasic acid residue and an alkylene glycol may be a diester diol. Such a diol may be defined by the formula

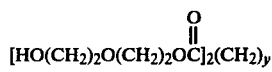

where y is 2 to 4.

The proportions of the reactants should be such as to give a resulting mixture of aromatic polyester polyols which have an average OH (hydroxyl) number within the desired range of about 100 to 400, preferably 125 to 250. The saponification number of the scrap polyethylene terephthalate (a measure of transesterification sites) should be considered in selecting proportions, if obtainable. One PET unit has a molecular weight of 192.2. Preferably the approximate mole ratio of scrap polyethylene terephthalate to dibasic acid to alkylene glycol may be about 1:1:2. These proportions could vary 5% in either direction. What actually forms the "polyol" of this invention is a mixture of very similar polyols having ester functions, even though the mixture is sometimes referred to as a singular "polyol."

Generally, both reactions need heat between ambient and about 300° C. to proceed. Preferably, the temperature for both steps should be between 140° and 220° C. Unlike some prior art processes, both steps are non-catalytic. The pressure can be atmospheric, subatmospheric or autogenous. The polyol should have a hydroxyl number in the range of 100 to 400, with an especially preferred hydroxyl number range of 125 to 300.

These aromatic polyester polyols have been found to have the following structure

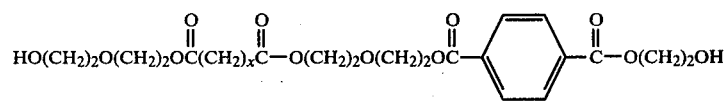

where x is an integer of from 2 to 4.

Turning to the other reactants useful in preparing the novel polycarbonates of this invention, it is found that an alkylene carbonate is necessary. Preferably, the alkylene carbonate is selected from the group consisting of ethylene carbonate, propylene carbonate and butylene carbonate and mixtures thereof. These carbonates generate alkylene oxides in situ to react with the polyol, carbon dioxide being generated as a by-product which is also a co-reactant in the process of making the polycarbonates herein. The mole ratio of alkylene carbonate to the polyol should be on the order of 1:1 to 25:1, preferably in the range from 2:1 to 20:1.

The process for making polycarbonates related to the polycarbonates of this invention is known and described in detail in U.S. Pat. No. 4,267,120, incorporated by reference herein. Generally, the alkylene carbonate (or, in the alternative, corresponding alkylene oxides and $CO_2$) is reacted with the polyol in the presence of a catalyst at an elevated temperature.

Catalysts useful in the practice of this invention include those basic catalysts known to catalyze the production of polycarbonates and include inorganic bases such as alkali carbonates among which are potassium carbonate, sodium carbonate, magnesium carbonate and the like. Alkali hydroxides, such as calcium hydroxide, etc., and alkaline bicarbonates, such as sodium bicarbonate, are also useful. The zinc borate-barium oxide system of U.S. Pat. No. 3,133,113 would also be effective. Preferred catalysts are the alkali stannates such as sodium stannate and potassium stannate, particularly the latter.

The process of this invention is carried out at a temperature of from about 125° to about 200° C. in a liquid phase reaction. A pressure in the range of atmospheric to 1,000 psig may be used, if desired. The reaction may be carried out batchwise or in a continuous manner, as for example, by passing the reactants through a tubular reaction zone under the conditions outlined. The resulting polycarbonates should have a hydroxyl number in the range from about 50 to 400.

The aromatic polyester polycarbonates formed by the process of this invention can be recovered from the reaction mixture by conventional techniques including neutralization of the reaction mixture, recovery of the product by vacuum distillation and filtration of the crude product. The unreacted materials recovered from the reaction mixture may be recycled for reuse according to the process described herein.

The novel polycarbonates prepared according to this invention are light to dark, viscous liquids which are particularly useful in the preparation of polyurethane foams of improved properties. The polycarbonates are believed to have the structure

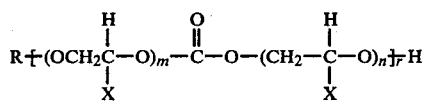

(I)

where m and n independently are integers of 1 through 5, r is an integer of 1 through 5, X is hydrogen, methyl or ethyl and R is the residue of an aromatic polyester polyol of structure (I). Here the term "residue" is used to mean the moiety or substituent originally part of a reactant that is now part of the new molecule.

The following examples, which are not intended to limit the scope of the invention, will further illustrate it.

EXAMPLE I

Into a five-gallon electrically heated kettle were charged 3.0 pounds of THANOL® R-510[1] and 2.83 pounds of ethylene carbonate. The reactor was then heated to 80° C. and 5.3 g of potassium stannate charged. The reactants were then heated at 180°–185° C. at a maximum pressure of 98 psig for 9.5 hours. The finished product was a dark, viscous product which had the following properties:

| | |
|---|---|
| Hydroxyl no., mg KOH/g | 153 |
| Viscosity, °F., cs | |
| 77 | 5159 |
| 100 | 1620 |
| Saponification number, mg KOH/g | 383.7 |
| Carbon dioxide content, wt % | 30.1 |
| Mole ratio linear carbonate/THANOL R-510 | 2.5[2] |
| Mole ratio polyether/THANOL R-510 | 2.5[2] |

[1]Aromatic polyester polyol having structure (I) made by Texaco Chemical Company
[2]Determined via nuclear magnetic resonance

EXAMPLE II

This example will illustrate the preparation of the aromatic polyester polycarbonate of this invention under different reaction conditions.

Into a five-gallon electrically heated kettle were charged 3.0 pounds of THANOL R-510 and 2.83 g of ethylene carbonate. The reactor was then evacuated and purged with prepurified nitrogen. The reactants were then heated to 80° C. and 30 g of potassium stannate added. The reaction mixture was then heated at 150° C. for 10.5 hours. The resultant product was a dark, viscous liquid having the following properties:

| | |
|---|---|
| Hydroxyl number, mg KOH/g | 157 |
| Viscosity, °F., cs | |
| 77 | 6860 |
| 100 | 1965 |
| Saponification number, mg KOH/g | 393.4 |
| Carbon dioxide content, wt. % | 30.95 |
| Mole ratio linear carbonate/THANOL R-510 | 3.7 |
| Mole ratio linear polyether/THANOL R-510 | 2.0 |
| Mole ratio unreacted ethylene carbonate/THANOL R-510 | 0.2 |

EXAMPLE III

This example will illustrate the use of the aromatic polyester polycarbonate of this invention in the preparation of low density packaging foam. It will further show that these low density foams had an excellent cell structure.

| | A | B | C | D |
|---|---|---|---|---|
| Formulation, pbw | | | | |
| Polyester polycarbonate of Example | 23 | 30 | 37 | 45 |
| THANOL R-650-X[1] | 34 | 30 | 23 | 15 |
| SURFONIC N-120[2] | 14.3 | 15 | 15 | 15 |
| THANOL SF-5505[3] | 28.7 | 25 | 25 | 25 |
| Fluorocarbon R-11b | 35 | 35 | 35 | 35 |
| Water | 20 | 20 | 20 | 20 |
| Y-6690 silicone[4] | 2.0 | 2.0 | 2.0 | 2.0 |
| THANCAT® DPA[5] | 5.0 | 5.0 | 5.0 | 5.0 |
| MONDUR MR[6] | 140.5 | 140.5 | 140.5 | 140.5 |
| Details of Preparation | | | | |
| Cream time, seconds | 12 | 12 | 12 | 12 |
| Rise time, seconds | 55 | 55 | 53 | 53 |
| Gel time, seconds | 60 | 55 | 53 | 55 |
| Properties | | | | |
| Density, pcf | 0.51 | 0.52 | 0.52 | 0.49 |
| Appearance | Open foam, even cell structure | | | |

[1]Aromatic amino polyol, hydroxyl number mg KOH/g 440–460 made by Texaco Chemical Co.
[2]Twelve mole ethylene oxide adduct of nonylphenol made by Texaco Chemical Co.
[3]5500 molecular weight high reactivity triol made by Texaco Chemical Co.
[4]Silicone surfactant made by Union Carbide Chemical Co.
[5]Two mole propylene oxide adduct of dimethylaminopropylamine made by Texaco Chemical Co.
[6]2.7 functionality polymeric isocyanate made by Mobay Chemical Co.

EXAMPLE IV

This example will illustrate the use of the aromatic polyester polycarbonate of Example I as an extender polyol in the preparation of rigid urethane foam.

| | E | F |
|---|---|---|
| Formulation, pbw | | |
| THANOL R-350-X[1] | 26.2 | — |
| THANOL R-650-X | — | 28.6 |
| Polyester polycarbonate of Example I | 11.2 | 12.2 |
| Antiblaze 80[2] | 5.0 | 5.0 |
| Water | 0.2 | 0.2 |
| Fluorocarbon R-11b | 12.0 | 12.0 |
| L-5420 silicone[3] | 0.5 | 0.5 |
| FOMREZ UL-32[4] | 0.01 | 0.01 |
| MONDUR MR | 44.9 | 41.5 |
| Isocyanate index | 1.2 | 1.2 |
| Reaction Details | | |
| Mix time, seconds | 8 | 6 |
| Cream time, seconds | 16 | 12 |
| Gel time, seconds | 71 | 60 |
| Tack free time, seconds | 110 | 84 |
| Rise time, seconds | 155 | 141 |
| Results | | |
| Initial surface friability | None | None |
| Foam appearance | Good | Good |

[1]Aromatic amino polyol, hydroxyl number mg KOH/g 520–540 made by Texaco Chemical Co. using techniques of U.S. Pat. No. 3,297,597
[2]Tris-(2-chloropropyl phosphate) made by Mobay Chemical Co.
[3]Silicone surfactant made by Union Carbide Chemical Corp.
[4]Organotin catalyst compound made by Witco Chemical Co.

EXAMPLE V

This example will illustrate the use of the aromatic polyester polycarbonate in the preparation of isocyanurate foam.

| | G |
|---|---|
| Formulation, pbw | |
| Polyester polycarbonate of Example I | 30.6 |
| Fluorocarbon R-11b | 12 |
| DC-193 silicone[1] | 0.5 |
| T-45[2] | 1.0 |
| MONDUR MR | 55.9 |
| Isocyanate index | 5.0 |
| Details of Preparation | |
| Mix time, seconds | 3 |
| Cream time, seconds | 4 |
| Gel time, seconds | 14 |
| Tack free time, seconds | 20 |
| Rise time, seconds | 40 |
| Properties | |
| Initial surface friability | None |

-continued

| | G |
|---|---|
| Foam appearance | Good |

[1] Silicone surfactant made by Dow-Corning Corp.
[2] Potassium octoate in glycol made by M & T Chemical Co.

EXAMPLE VI

This example will illustrate the use of the aromatic polyester polyol of Example I in the preparation of flexible urethane foams.

| | H |
|---|---|
| Formulation, pbw | |
| THANOL F-3016[1] | 90 |
| Polyester polycarbonate of Example I | 10 |
| Water | 4.0 |
| L-6202 silicone[2] | 1.0 |
| T-10 catalyst[3] | 0.5 |
| THANCAT TD-33[4] | 0.3 |
| Toluene diisocyanate | 51.3 |
| Isocyanate index | 1.05 |
| Details of Preparation | |
| Cream time, seconds | 12 |
| Rise time, seconds | 77 |
| Results | |
| Foam appearance | Good |
| Density, pcf | 1.5 |

[1] A 3,000 molecular weight propylene oxide/ethylene oxide triol made by Texaco Chemical Co.
[2] Silicone surfactant made by Union Carbide Chemical Corp.
[3] 50% stannous octoate in dioctyl phthalate made by M & T Chemical Co.
[4] 33% triethylenediamine in propylene glycol made by Texaco Chemical Co.

Many modifications may be made in the polycarbonates of the invention by one skilled in the art without departing from the spirit and scope of the invention which are defined only in the appended claims. For example, the particular aromatic polyester polyol or alkylene carbonate might be changed somewhat from those used herein, or the reaction catalyst, temperature or pressure might be altered to produce a polycarbonate with optimized characteristics.

We claim:

1. An aromatic polyester polycarbonate of the structure $$R \!+\! (OCH_2\underset{X}{\overset{H}{\underset{|}{C}}}\!-\!O)_m\!-\!\overset{O}{\underset{\|}{C}}\!-\!O\!-\!(CH_2\!-\!\underset{X}{\overset{H}{\underset{|}{C}}}\!-\!O)_n\!\!\!+\!\!\!_rH$$

where m and n independently are integers of from 1 to 5, r is an integer of from 1 to 5, X is hydrogen, methyl or ethyl and R is the residue of an aromatic polyester polyol of the structure $$HO(CH_2)_2O(CH_2)_2O\overset{O}{\underset{\|}{C}}(CH_2)_x\overset{O}{\underset{\|}{C}}-$$

$$-O(CH_2)_2O(CH_2)_2O\overset{O}{\underset{\|}{C}}-\!\!\!\left\langle\!\!\!\begin{array}{c}\\\end{array}\!\!\!\right\rangle\!\!\!-\overset{O}{\underset{\|}{C}}-O(CH_2)_2OH$$

where x is an integer of from 2 to 4.

2. An aromatic polyester polycarbonate made by the process comprising reacting an alkylene carbonate selected from the group consisting of ethylene carbonate, propylene carbonate and butylene carbonate with an aromatic polyester polyol in the presence of a polycarbonate formation catalyst selected from the group consisting of potassium stannate, potassium carbonate, barium oxide, zinc borate and calcium hydroxide, where the aromatic polyester polyol is made by the process of esterifying a dibasic acid waste stream with an alkylene glycol to produce a polyester polyol and transesterifying recycled polyethylene terephthalate with the polyester polyol from the previous step.

3. The aromatic polyester polycarbonate of claim 2 where the aromatic polyester polyol has the structure $$HO(CH_2)_2O(CH_2)_2O\overset{O}{\underset{\|}{C}}(CH_2)_x\overset{O}{\underset{\|}{C}}-$$

$$-O(CH_2)_2O(CH_2)_2O\overset{O}{\underset{\|}{C}}-\!\!\!\left\langle\!\!\!\begin{array}{c}\\\end{array}\!\!\!\right\rangle\!\!\!-\overset{O}{\underset{\|}{C}}-O(CH_2)_2OH$$

where x is an integer of from 2 to 4.

4. The aromatic polyester polycarbonate of claim 2 in which the reaction to make the polycarbonate is conducted at a temperature between 125° and 200° C.

5. The aromatic polyester polycarbonate of claim 2 in which the polycarbonate formation catalyst is present at a level from about 0.2 to 2.0 wt.% basis the total weight of the carbonate and polyol reactants.

6. The aromatic polyester polycarbonate of claim 2 where the resultant aromatic polyester polyol has a hydroxyl number in the range of from 125 to 250.

7. A polyurethane foam obtained by reacting in the presence of a blowing agent and a catalyst of polyurethane formation an organic polyisocyanate, a polyol and an organic polyester polycarbonate, where the polycarbonate is made by the process comprising
reacting an alkylene carbonate selected from the group consisting of ethylene carbonate, propylene carbonate and butylene carbonate with an aromatic polyester polyol in the presence of a polycarbonate formation catalyst selected from the group consisting of potassium stannate, potassium carbonate, barium oxide, zinc borate and calcium hydroxide, where the aromatic polyester polyol is made by the process of esterifying a dibasic acid waste stream with an alkylene glycol to produce a polyester polyol and transesterifying recycled polyethylene terephthalate with the polyester polyol from the previous step.

8. The polyurethane foam of claim 7 where the aromatic polyester polycarbonate has the structure $$R \!+\! (OCH_2\underset{X}{\overset{H}{\underset{|}{C}}}\!-\!O)_m\!-\!\overset{O}{\underset{\|}{C}}\!-\!O\!-\!(CH_2\!-\!\underset{X}{\overset{H}{\underset{|}{C}}}\!-\!O)_n\!\!\!+\!\!\!_rH$$

where m and n independently are integers of from 1 to 5, r is an integer of from 1 to 5, X is hydrogen, methyl or ethyl and R is the residue of an aromatic polyester polyol of the structure $$HO(CH_2)_2O(CH_2)_2O\overset{O}{\underset{\|}{C}}(CH_2)_x\overset{O}{\underset{\|}{C}}-$$

$$-O(CH_2)_2O(CH_2)_2O\overset{O}{\underset{\|}{C}}-\!\!\!\left\langle\!\!\!\begin{array}{c}\\\end{array}\!\!\!\right\rangle\!\!\!-\overset{O}{\underset{\|}{C}}-O(CH_2)_2OH$$

where x is an integer of from 2 to 4.

* * * * *